United States Patent
Suzuki et al.

(10) Patent No.: US 6,688,057 B2
(45) Date of Patent: Feb. 10, 2004

(54) STRUCTURE OF LINER AND PRIMARY CONTAINMENT VESSEL USING ITS STRUCTURE

(75) Inventors: Ayako Suzuki, Ibaraki (JP); Shigeru Nanba, Ibaraki (JP); Tsutomu Igari, Ibaraki (JP)

(73) Assignees: Hitachi, Ltd., Tokyo (JP); Hitachi Engineering Co., Ltd., Hitachi (JP)

( * ) Notice: Subject to any disclaimer, the term of this patent is extended or adjusted under 35 U.S.C. 154(b) by 0 days.

(21) Appl. No.: 09/934,692

(22) Filed: Aug. 23, 2001

(65) Prior Publication Data

US 2002/0073644 A1 Jun. 20, 2002

(30) Foreign Application Priority Data

Dec. 18, 2000 (JP) ........................................ 2000-383070

(51) Int. Cl.[7] ................................................. E04B 1/32
(52) U.S. Cl. .................. 52/245; 52/169.7; 52/192; 52/649; 52/244; 220/645; 220/654; 220/651; 220/62.15; 220/62.22
(58) Field of Search .............................. 52/245, 169.7, 52/192, 649.1, 244; 220/645, 654, 651, 62.15, 62.22

(56) References Cited

U.S. PATENT DOCUMENTS

| 1,688,868 A | * | 10/1928 | Horton ........................ 220/565 |
| 3,934,277 A | * | 1/1976 | Quirouette et al. ........... 52/245 |
| 4,118,809 A | * | 10/1978 | Bertsch ........................ 52/149 |
| 4,124,907 A | * | 11/1978 | Laven ........................ 52/169.7 |

FOREIGN PATENT DOCUMENTS

| JP | 58 117 492 | 7/1983 |
| JP | 2000-180 579 | 6/2000 |

* cited by examiner

*Primary Examiner*—Carl D. Friedman
*Assistant Examiner*—Steve M Varner
(74) *Attorney, Agent, or Firm*—Crowell & Moring LLP

(57) ABSTRACT

The present invention aims to reduce the manufacturing work load of a structure of a liner of a concrete wall. A plurality of liner anchors 10 is constructed longitudinally to one surface of a liner 11, and a plurality of flat bars 14 is constructed transversely to the other surface of the liner 11. Concrete for a reinforced concrete wall is installed using the liner 11 reinforced longitudinally and transversely by the liner anchors 10 and the flat bars 14 as a formwork, and the liner is constructed to the concrete wall by burying the liner anchors 10 to the concrete wall. Thereafter, the flat bars 11 are removed from the liner 14, according to need.

4 Claims, 5 Drawing Sheets

US 6,688,057 B2

STRUCTURE OF LINER AND PRIMARY CONTAINMENT VESSEL USING ITS STRUCTURE

FIELD OF THE INVENTION

The present invention relates to a structure of a liner provided to a concrete wall, and more particularly to a structure of a liner suitable for applying to a concrete wall of a primary containment vessel.

DESCRIPTION OF THE RELATED ART

As a structure of a liner provided to a concrete wall of a primary containment vessel, longitudinal and transverse reinforcements buried to the concrete are provided to the surface of the liner on the concrete side (outer surface). An example is disclosed in Japanese Patent Laid-Open No. 2000-180579.

In order to improve the reinforcing of the liner, the Japanese Patent Laid-Open No. S58-117492 discloses providing of the longitudinal and transverse reinforcements or one of the longitudinal and transverse reinforcements to the side of the liner opposite to the concrete side (inner surface).

In either case, the structure of the liner is formed so that the longitudinal and transverse reinforcements buried to the concrete are provided to the surface of the liner on the concrete side (outer surface). The reinforcement provided to the outer surface of the liner in the longitudinal direction (vertical direction) is a shaped steel equipped with a T-shaped cross section (T-steel) called a liner anchor, and the reinforcement provided in the transverse direction (horizontal direction) is a flat steel called a flat bar.

The construction of a primary containment vessel made of reinforced concrete is carried out first by installing reinforced concrete for the bottom. Then, a bottom liner of a suppression chamber is provided on top of the reinforced concrete, with the surrounding liner mounted in parallel thereto. Next, the reinforcing bars are arranged, the outer concrete frame is mounted, and concrete is installed.

In a nuclear power plant, a primary containment vessel is provided inside a reactor building as a primary containment of a reactor pressure vessel. When installing concrete after assembling reinforcing bars in the stage of setting the primary containment vessel, a formwork made of wood and the like is used for the outer side, and the liner for the inner wall is used directly to serve also as the formwork for the inner side. The liner is equipped with vertical liner anchor members and longitudinal reinforcement members, that is, a flat bar.

The flat bar is formed with holes in a suitable pitch to prevent air from accumulating during installation of concrete. Moreover, a plurality of penetrations is provided to the side wall in a penetrated condition. The penetration has the structure of equipping a sleeve 15 that is a tubular hollow structure to a flange plate 16, as is shown in FIG. 5, and is equipped by welding and fixing the flange plate 16 to the liner.

The liner anchors and the flat bars 14 cross over to the flange plate 16 from the liner, are provided as is shown in FIG. 5, to increase rigidity of the penetration.

SUMMARY OF THE INVENTION

The flat bars mentioned above are constructed to the liner by cutting the liner anchors on the outer side, so that the crossing region must be performed with welding, as well as holes for removing air must be provided to the flat bar at a suitable pitch to prevent air from accumulating during installation of concrete. This results in heavy work load.

Also, the liner anchors or the flat bars 14 cannot be provided to the vicinity of the sleeve 15 of the penetration, in order to avoid interference with gusset plates 17 provided between the surface of the flange plate on the concrete side and the hollow structure, as is shown in FIG. 5. Therefore, the reinforcing effect by the liner anchors and the flat bars is small.

The present invention, based on circumstances mentioned above, aims to reduce work load for the structure of the liner of the concrete wall. The other object of the present invention is to improve reinforcing of the penetration.

In order to achieve the above-mentioned object, the present invention provides each reinforcements conventionally provided so as to cross inside a common plane at the outer surface of the liner to the liner so as to cross three-dimensionally with the liner interposed therebetween. Each of the reinforcements cross each other, however three-dimensionally, so that equal reinforcing function as is in the conventional case of crossing the reinforcements could be obtained, as well as the manufacturing work load of the structure of liner could be reduced because each of the reinforcements does not cross each other inside a common plane.

Also, the reinforcements in the transverse direction are concentrated to the inner surface side of the liner, so that air removal during installation of concrete at the outer surface side could be carried out without performing special operation to the reinforcements.

Moreover, the reinforcement members provided to the liner surface at the concrete wall side are the longitudinal reinforcement members, so that anchor effect of the liner to the concrete wall could be expected from the reinforcement members working as liner anchors.

Furthermore, in reinforcing the penetration of the liner, the transverse reinforcements relocated to the inner surface of the liner are elongated to the sleeve side without the distress of interference with the gusset plates and are made to approach the sleeve, so that the reinforced region by the transverse reinforcements are enlarged to contribute improving reinforcing of the penetration of the liner.

The structure of the liner is utilized by being constructed to the concrete wall of a primary containment vessel.

DETAILED DESCRIPTION OF PREFERRED EMBODIMENTS

Figure 1:
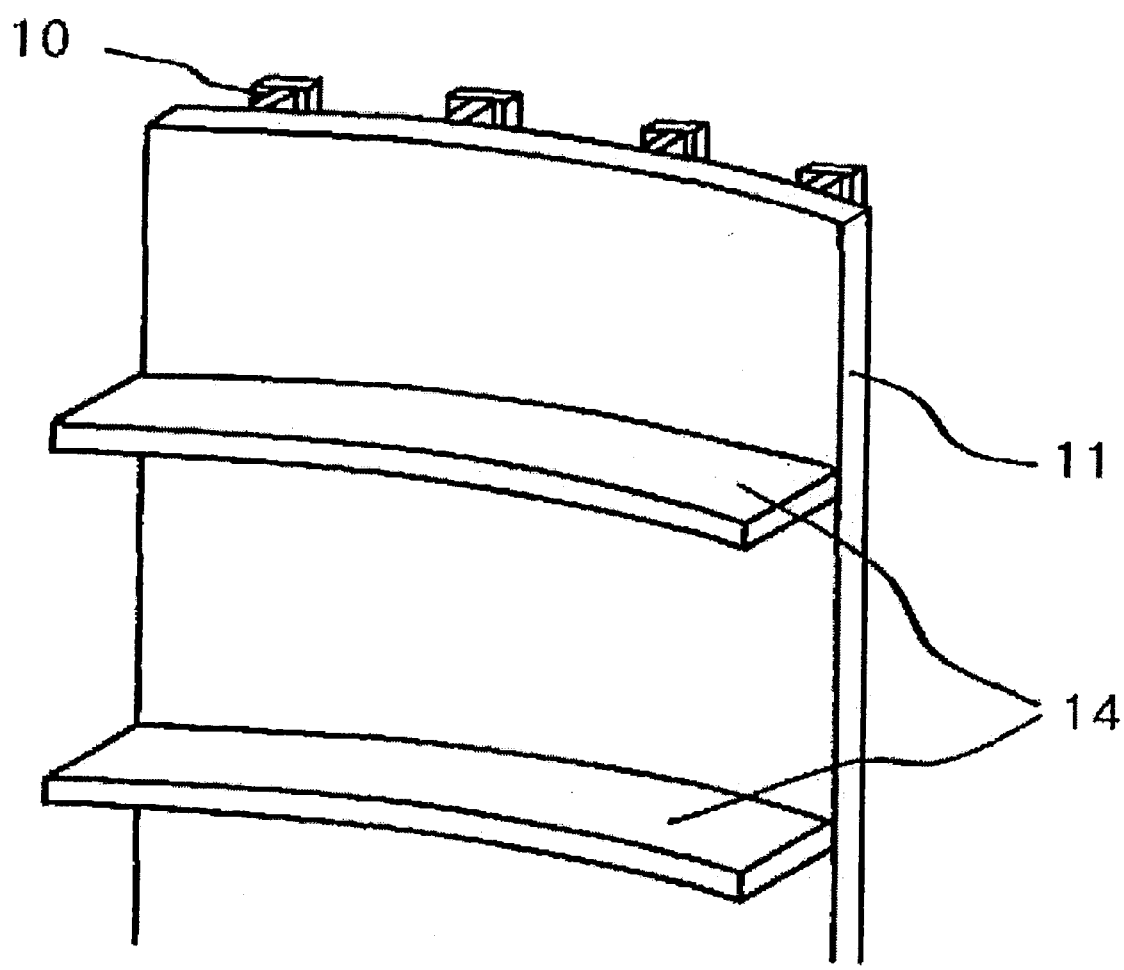
FIG. 1 is a perspective view of a structure of a liner according to an embodiment of the present invention.
Figure 2:
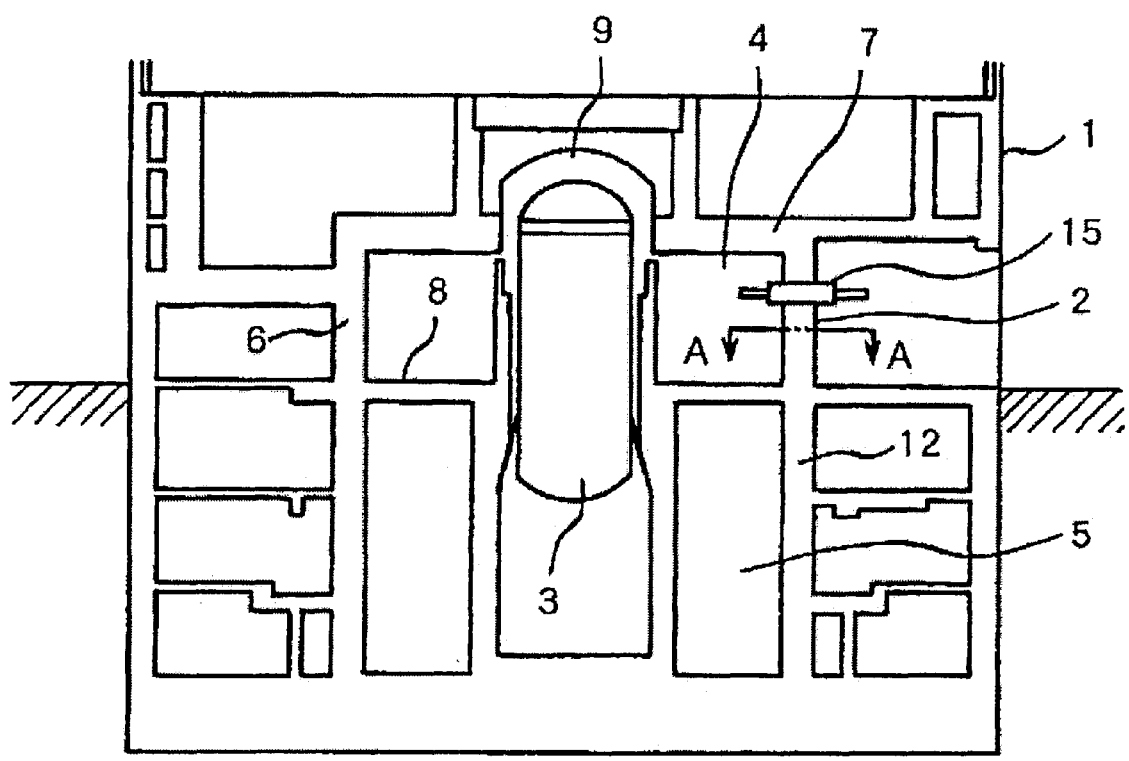
FIG. 2 is a longitudinal cross-sectional view of a reactor building with the structure of the liner in FIG. 1 being adopted to a region for a primary containment vessel.

The embodiment of the present invention will be described hereinbelow with reference to the drawings. To a reactor building 1 of a nuclear power plant, a primary containment vessel 2 is provided as a primary containment for a reactor pressure vessel 3, so that the radioactive substances leaking from a reactor core in a disruptive accident of a nuclear reactor primary system are refrained from discharging to the exterior, as is shown in FIG. 2.

The boiling water reactor primary containment vessel 2 is constituted from a zone of a dry well 4 and a zone of a suppression chamber 5. The drywell 4 is constituted by being covered by a cylindrical drywell side wall 6 (shell wall), a top slab 7 (ceiling wall), a diaphragm floor 8 and a drywell formed head 9 that is a self-supporting steel-made portion, and by an inner circumferential surface of a cylindrical foundation of the primary containment vessel main body and a bottom surface of the containment vessel.

The top slab 7 and the drywell side wall 6 (shell portion) constituting the drywell 4 are skeletons made of reinforced concrete with a liner 11 made of steel lined via liner anchors 10 made of T-steel. The inner surface of the liner 11 is provided with flat bars 14.

Figure 3:
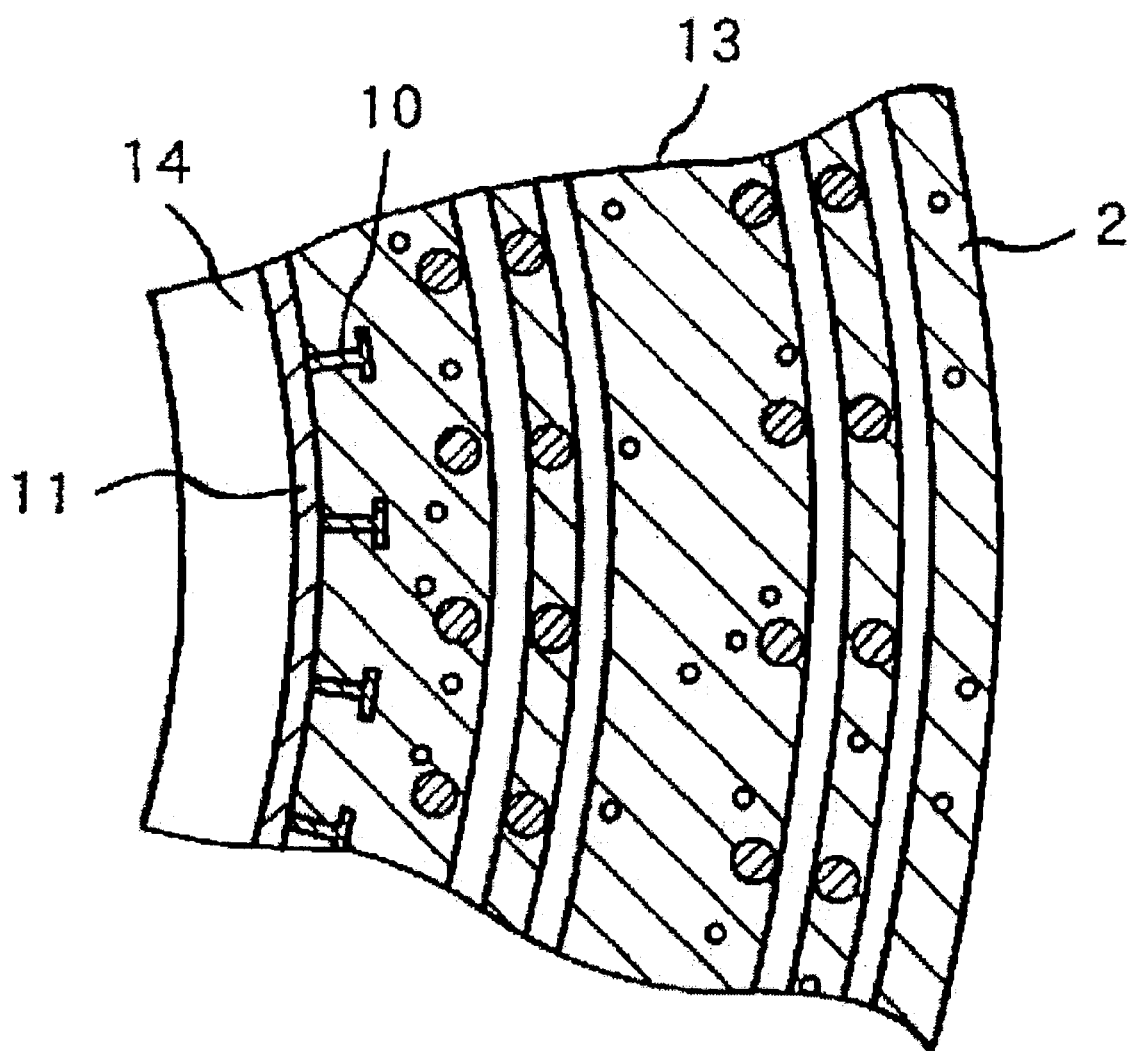
FIG. 3 is a cross-sectional view taken along line A—A in FIG. 2.
Figure 4:
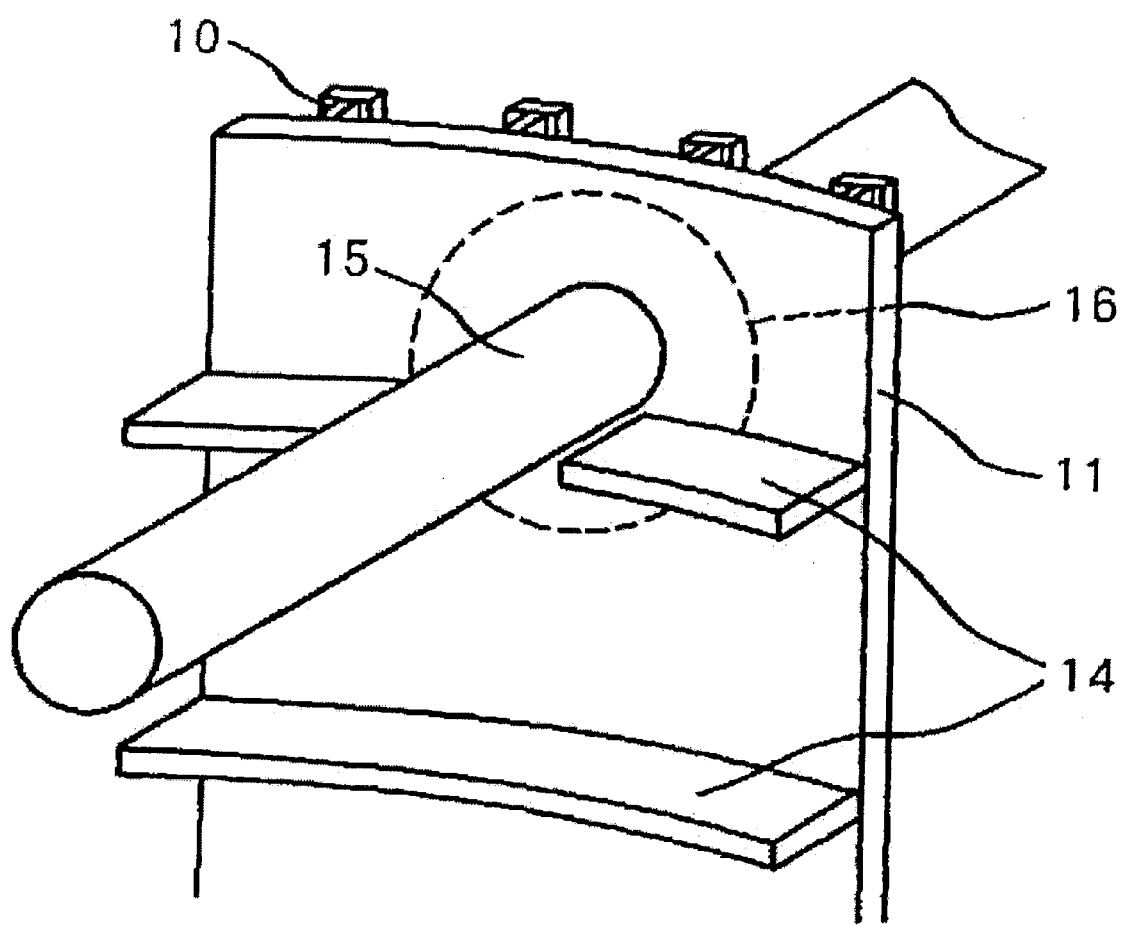
FIG. 4 is a perspective view of a structure of a liner at the penetration in an embodiment of the present invention, taken from the inner surface side of the liner.
Figure 5:
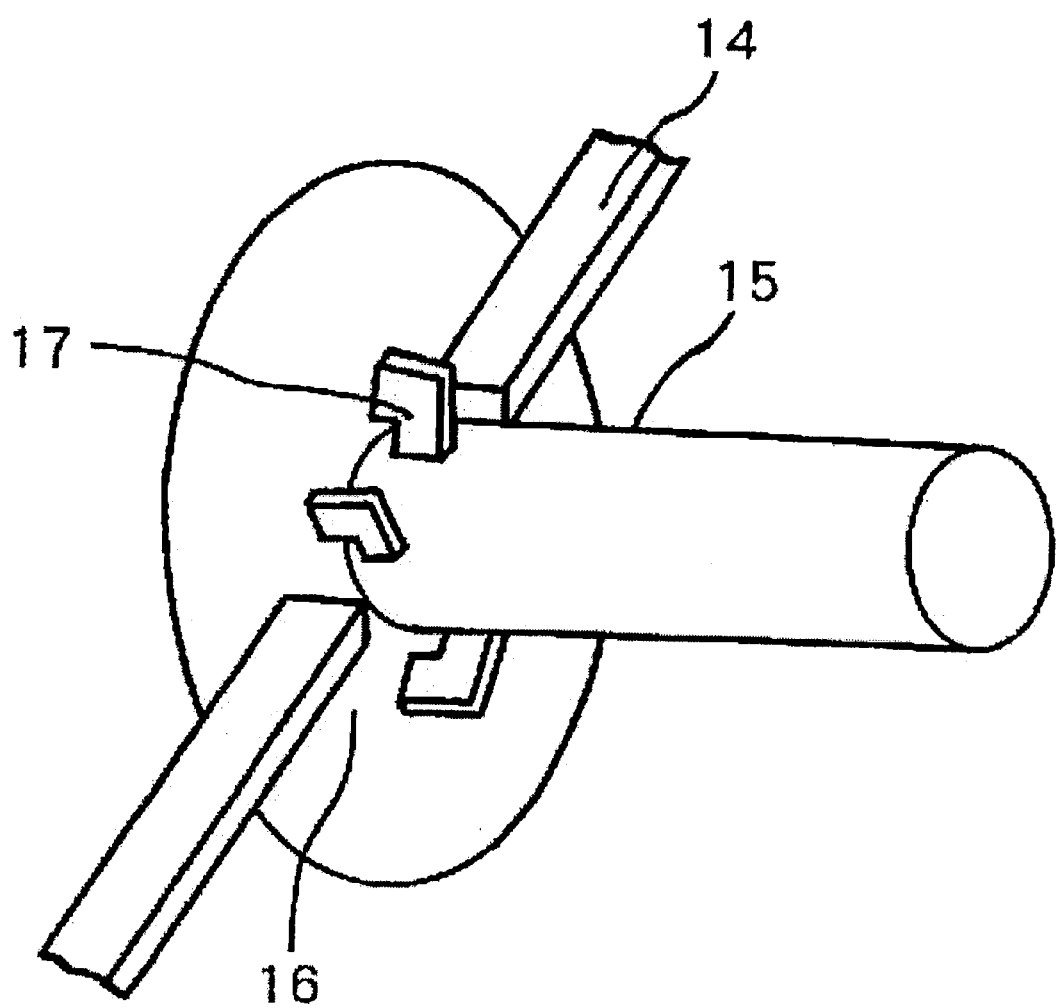
FIG. 5 is a perspective view of the arrangement of the flat bar at conventional penetration, take from the outer surface side of the liner.

As an example, the drywell side wall 6 is as is shown in FIG. 3 and FIG. 4. That is, the liner anchors 10 aligned longitudinally (vertically) are welded to the outer surface (the surface on the side of the reinforced concrete wall 13) of the curved liner 11, and the flat bars 14 aligned transversely (horizontally) are welded to the opposite inner surface (the surface on the other side of the reinforced concrete wall 13).

As is seen from above, the liner 11 has the constitution of a welded assembly reinforced with the longitudinal and transverse liner anchors 10 and flat bars 14. The liner anchors 10 are buried inside the concrete of the reinforced concrete wall 13, in order to prevent the liner 11 from exfoliating from the reinforced concrete wall 13. The suppression chamber side wall 12 constituting the suppression chamber 4 is the same as the drywell side wall 6. It is the same with the top slab 7, and the liner anchors 10 are welded and constructed horizontally to the upper surface of a horizontal liner 11, that is, the surface of the top slab 7 on the side of the reinforced concrete wall, and the flat bars 14 are welded and constructed to the opposite surface in a horizontal direction orthogonal to the liner anchors 10.

As is seen from above, the top slab 7, the drywell side wall 6, and the suppression chamber side wall 12 are constructed so that liner anchors 10 are buried inside the reinforced concrete wall 13, in order for the reinforced concrete wall 13 portion to exert the function of pressure-proof, earthquake-proof and radiation shield, and the surface of the reinforced concrete wall 13 is lined by the liner 11 to provide the function of leakage prevention.

The liner 11 and the liner anchors 10 are not required to perform the function as the strengthening member for pressure-proof and earthquake-proof function of the skeleton of the containment vessel made of reinforced concrete. However, because the liner 11 and the liner anchors 10 are used as a concrete installation frame for the concrete walls when constructing the primary containment vessel, they are designed to support such installation pressure.

The reinforcing bars for reinforcement are buried inside the concrete wall 13 in a standing condition, and the liner anchors 10 provided in a vertical direction are formed to the outer surface of the liner 11 in a condition of being buried inside the concrete wall 13. The technique described hereinbelow will be added to these members.

More than two of the flat bars 14 in the horizontal direction are provided to the inner surface of the liner 11. By providing the same to the inner surface of the liner 11, there is no need to open holes in order to prevent air from accumulating to the lower surface of the flat bar 14 during installation of the concrete, so that the operation process could be reduced.

From the fact that the liner anchors 10 and the flat bars 14 do not cross inside a common surface, there is no need to cut the liner anchors 10 in the middle for arranging the flat bars 14. This results in reducing the man-hour for cutting operation and amount of welding of the liner anchors 10, and in reducing the operation process.

As is shown in FIG. 4, a sleeve 15 of the penetration penetrates the liner 11 and the reinforced concrete wall 13. The sleeve 15 of the penetration is equipped to a flange plate 16, and the flange plate 16 is connected to the liner 11 by welding. Gusset plates 17 are performed with weldbonding between the sleeve 15 and the surface of the flange plate 16 at the side of the concrete wall 13.

The surface of the flange plate 16 at the side opposite to the concrete wall is in a condition of overlapping with the flat bar 14 extended from the liner side, in order to increase the rigidity of the penetration, as is shown in FIG. 4. By providing the flat bar 14 to the inner surface of the liner 11, the reinforced region could be extended while avoiding interference with the gusset plates 17.

The liner anchors 10 are not cut, as is mentioned above, so that they could be used in a length more than double the conventional length. This results in reducing the cutting process towards the purchased commercial T-steel. Moreover, after the concrete for the reinforced concrete wall is installed, the flat bars 14 used in order to bear the installation load becomes unnecessary, so that the unnecessary flat bars 14 could be removed from the liner 11 and be reused. Also, the flat bars 14 could be remained on the liner 11 after installation of concrete for the reinforced concrete wall, and be used as a support or as a place for holding goods, according to the condition of use for each of the plants.

As is explained above, with the horizontal-direction flat bars being provided to the inner surface of the liner, according to the embodiment of the present invention, there is no need to open holes for preventing air from accumulating to the flat bars when installing concrete, so that operation process could be reduced. Moreover, the liner anchors provided vertically to the outer surface of the liner are not cut and are used as a whole in the vertical direction, so that man-hour for cutting operation and the amount of welding of the liner anchors could be reduced. Furthermore, the flange plate of the penetration provided to the liner under the condition of removing partially the liner anchors and the flat bars has no interference with the gusset plates, so that the flat bars could be provided to the vicinity of the sleeve, resulting in improving the rigidity of the penetration.

After installation of concrete for the reinforced concrete wall, the flat bars does not serve as the strength member of the primary containment vessel made of concrete, so that the same could be removed from the liner and be reused as steel lumber. Also, the flat bars could be remained mounted to the liner, and be used as a support for piping and the like installed inside the primary containment vessel made of concrete.

As is mentioned above, with the embodiment of the present invention, the liner anchors 10 and the flat bars 14 that are reinforcements provided to the liner 11 in a different direction from each other do not cross inside a common surface, so that the cutting operation of the reinforcements or the welding operation at the crossing region could be reduced.

Also, the flat bars 14 as the reinforcements in a transverse (horizontal) direction of the vertical and horizontal reinforcements do not exist inside the reinforced concrete wall 13, so that air removal at installation of concrete for the reinforced concrete wall 13 could be performed smoothly, so that the operation for providing air holes to the flat bars 14 becomes unnecessary.

Moreover, because the liner anchors 10 are embedded to the reinforced concrete wall 13 in a T-shape, the reinforcement of the liner 11 as well as the inhibition of the exfoliation from the concrete wall 13 could be achieved.

Furthermore, the reinforced region of the flange plate 16 of the penetration with the flat bars 14 could be enlarged to the position enabling access to the sleeve 15, so that the reinforcement of the penetration with the flat bars 14 could be improved.

Moreover, with the primary containment vessel adopting the structure of the liner of the present invention, the liner anchors 10 and the flat bars 14 that are reinforcements provided at an angle against each other do not cross inside a common plane, so that the cutting operation of the liner anchors 10 or the welding operation at the crossing section are eliminated, and the building process of the primary containment vessel could be shortened.

Still further, with the primary containment vessel adopting the structure of the liner which enlarges the reinforced region of the flange plate 16 with the flat bars 14 to the position enabling access to the sleeve 15, the reinforcing of the penetration of the primary containment vessel penetrated by the sleeve 15 could be improved.

According to the structure of the liner of the present invention, the manufacturing work load of the structure of the liner could be reduced, because the reinforcements do not cross inside a common plane. Moreover, with the primary containment vessel of the present invention adopting such structure of the liner, the construction process of the primary containment vessel could be shortened.

We claim:

1. A structure of a liner, a liner a plurality of first reinforcement members mounted to one surface of said liner so as not to cross each other; and a plurality of second reinforcement members mounted to another surface of said liner opposite said one surface so as not to cross each other;

wherein said first reinforcing member and said second reinforcing member cross each other with said liner interposed therebetween, and each of said plurality of said first reinforcement members extends transversely to the one surface of said liner, wherein said first reinforcement member is a liner anchor extending in a longitudinal direction, and said second reinforcement member is a flat bar extending in a horizontal direction and extending transversely to the another surface of said liner, said flat bar is fixed to a flange plate connected to said liner and to the another surface said liner.

2. A primary containment vessel utilizing a structure of a liner, comprising;

a concrete wall;

a plurality of first reinforcement members buried and installed to said concrete wall so as not to cross each other;

a liner with one surface thereof mounted to said plurality of first reinforcement members; and a plurality of second reinforcement members mounted to other surface of said liner so as not to cross each other and so as to cross said first reinforcing member with said liner interposed therebetween.

3. A primary containment vessel utilizing a structure of a liner according to claim 2, wherein said first reinforcement member is a liner anchor extending in a longitudinal direction, and said second reinforcement member is a flat bar extending in a horizontal direction.

4. A primary containment vessel utilizing a structure of a liner according to claim 3, wherein said flat bar is fixed and installed to a flange plate provided to a penetration of said liner, and to said liner.

* * * * *